United States Patent [19]

Okita et al.

[11] Patent Number: 4,518,656

[45] Date of Patent: May 21, 1985

[54] MAGNETIC RECORDING MEDIUM AND PROCESS FOR PRODUCING THE SAME

[75] Inventors: Tsutomu Okita; Kyoichi Naruo, both of Shizuoka, Japan

[73] Assignee: Fuji Photo Film Co., Ltd., Kanagawa, Japan

[21] Appl. No.: 537,552

[22] Filed: Oct. 3, 1983

Related U.S. Application Data

[63] Continuation of Ser. No. 345,829, Feb. 4, 1982.

[30] Foreign Application Priority Data

Feb. 4, 1981 [JP] Japan .................................. 56-15393

[51] Int. Cl.$^3$ .............................................. H01F 10/02
[52] U.S. Cl. ...................................... 428/403; 427/44; 427/128; 427/130; 428/522; 428/533; 428/694; 428/900
[58] Field of Search ................................ 427/127–132, 427/48, 44; 428/900, 694, 403, 522, 533

[56] References Cited

U.S. PATENT DOCUMENTS

| | | | |
|---|---|---|---|
| 4,224,357 | 9/1980 | Iwai et al. | 427/44 |
| 4,233,425 | 11/1980 | Tefertiller et al. | 427/44 X |
| 4,234,676 | 11/1980 | Hein et al. | 427/44 |

Primary Examiner—Bernard D. Pianalto
Attorney, Agent, or Firm—Sughrue, Mion, Zinn, Macpeak & Seas

[57] ABSTRACT

A magnetic recording medium and a process for producing a magnetic recording medium are disclosed, the process comprising the steps of applying onto a nonmagnetic base a composition comprising (1) a compound having an unsaturated bond polymerizable by electron beams, (2) at least one polymer, (3) ferromagnetic particles, and (4) an organic solvent, and then polymerizing and curing the resulting magnetic layer by irradiation with electron beams, said polymer being such that at least 10% thereof is adsorbed on the ferromagnetic particles in a mixture of 10 parts by weight of a 1 wt % solution of the polymer and 1 part by weight of the ferromagnetic particles.

7 Claims, No Drawings

MAGNETIC RECORDING MEDIUM AND PROCESS FOR PRODUCING THE SAME

This application is a continuation of application Ser. No. 345,829, filed Feb. 4, 1982.

FIELD OF THE INVENTION

The present invention relates to a magnetic recording medium and a process for producing the same, and more particularly, to a magnetic recording medium having good electric characteristics and high wear resistance.

BACKGROUND OF THE INVENTION

Most conventional magnetic recording materials are produced using a binder of a thermoplastic resin such as vinyl chloride acetate resin, vinyl chloride/vinylidene chloride resin, cellulose resin, acetal resin, urethane resin and acrylonitrile butadiene resin which are used either alone or in combination. However, one defect of such mediums is that the magnetic layer is unsatisfactorily wear-resistant and tends to foul the tape transport path.

Methods are known that use a thermosetting resin such as melamine resin or urea resin or blend the thermoplastic resins described above with a binder that forms crosslinkages by chemical reaction, such as an isocyanate compound or an epoxy compound. However, such crosslinkable binders have two important disadvantages: (1) the resin solution having magnetic particles dispersed therein does not have long keeping quality (i.e., has a short pot life) and the resulting magnetic coating composition, and hence the magnetic tape, tends not to have consistent physical properties; and (2) after drying the applied magnetic coating composition, it must be heated for curing, and this results in prolonged processing time.

To overcome these disadvantages, Japanese Patent No. 12423/72 and Japanese Patent Application (OPI) Nos. 13639/72, 15104/72 and 77433/75 (the term "OPI" as used herein refers to a "published unexamined Japanese patent application") propose methods for producing a magnetic recording medium which use a binder of an acrylate ester oligomer and monomer and cure the dried magnetic coating composition by irradiation with electron beams. However, such methods are not capable of producing a magnetic recording medium having good electrical characteristics and mechanical properties.

There has been an increasing demand for providing magnetic recording media with better electrical characteristics by using a magnetic coating composition comprising a good dispersion of ferromagnetic particles. A poor dispersion of ferromagnetic particles can cause low output or noise. The conventional method of curing the magnetic coating composition by electron beams is not satisfactory since if a high concentration of magnetic particles are contained therein to achieve higher-density recording, the resulting magnetic coating composition has a short pot life and cannot provide a magnetic tape having electrical characteristics that withstand practical use. On the other hand, a thin base is required for achieving extended recording and to meet this requirement, the mechanical properties of the magnetic coating composition must be improved.

Furthermore, with the use of multi-functional video cassette recorders, there has been a demand for video tape that withstands service under hostile conditions, but it has not yet been possible to prepare a magnetic recording medium having sufficiently satisfactory mechanical properties.

SUMMARY OF THE INVENTION

One object of the present invention is to provide a magnetic recording medium having good electrical characteristics and a process for producing such magnetic recording medium.

Another object is to provide a magnetic recording medium having a magnetic layer having good mechanical properties and a process for producing such magnetic recording medium.

Still another object is to provide a process for producing a magnetic recording medium that uses a magnetic coating composition having a long pot life and consistent physical properties.

A further object is to provide a magnetic recording medium having high wear resistance and a process for producing such magnetic recording medium.

A still further object is to provide a process for producing a magnetic recording medium that obviates the heating step for curing the applied magnetic coating composition.

To meet the above objects, the present inventors have made extensive studies on the conventional method of using a thermoplastic and thermosetting binders, methods of using a binder that forms cross-linkages by chemical reaction, and methods of using a binder that cures upon irradiation with electron beams, and have accomplished the invention described hereunder.

The objects of the present invention can be achieved by a process which comprises the steps of applying onto a non-magnetic base a composition comprising (1) a compound having an unsaturated bond polymerizable by electron beams, (2) at least one polymer, (3) ferromagnetic particles, and (4) an organic solvent, removing the organic solvent, smoothing the applied magnetic coating layer with a mirror finishing roll, and then polymerizing and curing the smoothed coating by irradiation with electron beams, said polymer being such that at least 10% thereof is adsorbed on the ferromagnetic particles in a mixture of 10 parts by weight of a 1 wt % solution of the polymer and 1 part by weight of the ferromagnetic particles.

DETAILED DESCRIPTION OF THE INVENTION

The compound having an unsaturated bond polymerizable by electron beams is a compound having one or more carbon-carbon unsaturated bonds. Examples are compounds containing an acryloyl group, acrylamido group, allyl group, vinyl ether group or vinyl thioether group, and unsaturated polyesters. Specific examples include acrylic acid, itaconic acid, methyl acrylate and homologous acrylic acid alkyl esters; styrene and homologous $\alpha$-methylstyrene and $\beta$-chlorostyrene; acrylonitrile, vinyl acetate and vinyl propionate. Two or more unsaturated bonds may be present in the molecule. Examples of such compound are found in *Kankosei Jushi Data-Shu* (*A List of Data on Photosensitive Resins*), published by Sogo Kagaku Kenkyusho, December 1968, pp. 235-236. Particularly preferred compounds are unsaturated esters of polyols such as ethylene diacrylate, diethylene glycol diacrylate, glycerol triacrylate, ethylene diacrylate and pentaerythritol tetraacrylate, and glycidyl acrylate having an epoxy ring. A compound having one unsaturated bond in the molecule may be used in combination with a compound having two or more unsaturated bonds.

These compounds are oligomeric compounds as described below. Particularly preferred high molecular weight compounds are those which have an acrylate group at terminal ends of the straight chain or the side chain, and such compounds are disclosed in A. Vrancken, *Fatipec Congress,* Vol. 11, p. 19 (1972). An example is represented below:

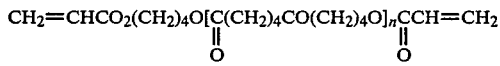

The polyester unit of the above formula may be replaced by a polyurethane unit, epoxy resin unit, polyether unit and polycarbonate unit, or a mixture thereof. These componds have a molecular weight of 1,000 to 20,000 to which they are by no means limited. A mixture of the above named monomers and polymers may be used as the compound polymerizable by electron beams.

According to the finding of the present inventors, a magnetic coating composition comprising a highly uniform dispersion of ferromagnetic particles can be produced by adding such polymer at least 10% of which is adsorbed on ferromagnetic particles in a mixture of 10 g of a 1 wt % solution of the polymer and 1 g of the ferromagnetic particles. These polymers typically have from 0.01 to 10 wt % of a polar group such as $-CO_2H$ group, $-CONH_2$ group, or $-OH$ group on the basis of the polymer weight. Specific examples are vinyl chloride/vinyl acetate/acrylic acid copolymer, vinyl chloride/vinyl propionate/maleic acid copolymer, vinyl chloride/vinyl acetate/maleic acid copolymer, butyl acrylate/acrylic acid copolymer, ethylene/vinyl acetate/vinyl alcohol copolymer, vinyl chloride/vinyl acetate/acrylamide copolymer, and ethyl acrylate/acrylamide copolymer. If the content of the polar group is outside the above range, the dispersibility of the magnetic particles is unstable. Other examples are cellulosic resins such as nitrocellulose, cellulose diacetate, cellulose acetate propionate, and cellulose acetate butyrate; and acetal resins such as formaldehyde resin, acetal resin and butyral resin. By adding these polymers, a magnetic coating composition having a very long pot life can be obtained. The adsorbable polymer is added preferably in a weight of from 0.01 to 0.2 part, more preferably from 0.05 to 0.15 part, per part by weight of the magnetic particles. The weight ratio of the (1) compound having an unsaturated bond polymerizable by electron beams to the adsorbable polymer is preferably from 5:95 to 95:5, and more preferably from 10:90 to 90:10. If this range is not observed, the dispersibility of the magnetic particles is decreased, or higher energy is necessary for polymerization.

Suitable ferromagnetic particles include finely divided ferromagnetic iron oxide, chromium dioxide, and metal alloys. The ferromagnetic iron oxide and chromium dioxide particles have a length to breadth ratio of from about 2/1 to 20/1, and preferably at least 5/1, and an average length of from about 0.2 to 2.0 $\mu$m. The ferromagnetic alloy particles are such that at least 75 wt % thereof is metal and at least 80 wt % of the metal is a ferromagnetic metal (i.e., Fe, Co, Ni, Fe—Co, Fe—Ni, Co—Ni, or Fe—Co—Ni) and have a major axis of not more than about 1.0 $\mu$m.

Suitable organic solvents include ketones such as acetone, methyl ethyl ketone, methyl isobutyl ketone and cyclohexanone; esters such as methyl acetate, ethyl acetate, butyl acetate, ethyl lactate and glycol acetate monoethyl ether; ethers and glycol ethers such as glycol dimethyl ether, glycol monoethyl ether and dioxane; aromatic hydrocarbons such as benzene, toluene and xylene; and chlorinated hydrocarbons such as methylene chloride, ethylene chloride, carbon tetrachloride, chloroform, ethylene chlorohydrin and dichlorobenzene.

After coating a magnetic composition, the magnetic layer can be smoothed whereby electric properties can be markedly improved. For smoothing the surface of the magnetic layer, calendering can be performed with two mirror finishing rolls or with a mirror finishing roll and an elastic roll. The mirror finishing roll may be a metal roll, and the elastic roll may be a cotton roll or synthetic resin (e.g., nylon or polyurethane) roll.

Preferably, the magnetic layer is calendered with a train of 30 rolls at a nip pressure of from about 25 to 400 kg/cm, preferably from 50 to 100 kg/cm, at a temperature of from about 10° to 150° C., and more preferably from 10° to 70° C., and at a rate of from 5 to 200 m/min. Higher temperatures and nip pressure result in magnetic layer sheding or base deformation. If the calendering speed is less than about 5 m/min, the desired smoothing effect is not achieved, and if it is more than about 200 m/min, the smoothing operation becomes difficult.

In the process of the present invention, removal of organic solvent, smoothing of magnetic layer and irradiation with electron beams can be effected in any order. Thus, the magnetic layer can be smoothed by mirror finishing rolls before or after the organic solvent is removed from the magnetic layer. The removal of organic solvent can be effected before and/or after irradiation with electron beams. The organic solvent may be completely or partially removed. For instance, the magnetic medium after coating can be left to stand or dried under ordinary conditions to remove all or part of the organic solvent, and subsequently the medium can be smoothed and then irradiated with electron beams, or the medium is irradiated with electron beams and then smoothed.

The magnetic coating composition of the present invention may further contain suitable additives such as lubricant, abrasive, corrosion inhibitor or antistat (e.g., antistatic agent). Examples of useful lubricants are a saturated or unsaturated higher aliphatic acid, aliphatic acid ester, higher aliphatic acid amide, higher alcohol, silicone oil, mineral oil, edible oil, and fluorine-containing compounds. These lubricants may be added at the time that the magnetic coating composition is prepared. Alternatively, they can be spread or sprayed onto the magnetic layer after drying, smoothing or curing (by electron beams) thereof either directly or in the form of a solution in an organic solvent.

The coating composition can be prepared by charging a mixer with the magnetic particles and all other ingredients simultaneously or sequentially. A dispersant may be added simultaneously with the magnetic powder.

Various mixers may be used to achieve thorough mixing of the magnetic coating composition. Examples are a two-roll mill, ball mill, sand grinder, disperser, high-speed impeller disperser and high-speed mixer homogenizer.

A magnetic layer can be formed from the magnetic coating composition on a base by doctor coating, blade coating, air knife coating, squeeze coating, reverse roll coating and gravure coating. The magnetic coating composition is applied to the base to form a coating having a dry thickness of from about 0.5 to 15 μm. The dry thickness of the magnetic coating is determined by the use, shape, and other specifications of the magnetic recording medium.

The magnetic layer thus-formed on the base is dried after the magnetic particles in the coating are optionally oriented in an a.c. or d.c. magnetic field having a magnetizing force of from about 500 to 3,000 Oe.

The oriented magnetic layer is dried generally at between about 50° and 120° C., and preferably between 70° and 100° C., more preferably between 80° and 90° C., for a duration of from about 30 seconds to 10 minutes, preferably from 1 to 5 minutes, with air supplied at a rate of 1 to 5 kiloliters/m², preferably 2 to 3 kiloliters/m². Before the drying, the surface of the magnetic layer may be smoothed by a magnet smoother, smoothening coil, smoothening blade or smoothening blanket.

Suitable non-magnetic bases include polyesters such as polyethylene terephthalate and polyethylene-2,6-naphthalate; polyolefins such as polyethylene and polypropylene; cellulose derivatives such as cellulose triacetate; polycarbonate, polyimide and polyamideimide; non-magnetic metals such as aluminum, copper, tin, zinc and non-magnetic alloys including the same; paper, and paper coated or laminated with polyolefins. The non-magnetic base may be in the form of a film, tape, sheet, disc, card, drum or other suitable shapes, and a suitable material can be selected from among the various possible materials depending on the desired form and properties. The back surface (opposite the side having the magnetic layer) of the base may be provided with a back coating for various purposes, e.g., prevention of static buildup, transfer, and wow flutter, as well as improvement of the strength of the magnetic recording medium and the matting of the back surface.

Suitable electron beam accelerators include a Van de Graaff scanning accelerator, double scanning accelerator and curtain beam accelerator. A curtain beam accelerator is preferred because of its low price and high power output. The acceleration voltage is generally from 100 to 1,000 kilovolts, and preferably 150 to 300 kilovolts. The absorbed dose is generally from 0.5 to 20 megarads, preferably from 2 to 10 megarads. An acceleration voltage lower than 100 kilovolts causes insufficient energy transmission, and a voltage higher than 1,000 kilovolts reduces the energy necessary for polymerization. If the absorbed dose is less than 0.5 megarad, the curing reaction is not sufficient to provide a magnetic medium having high strength, and if the dose is greater than 20 megarads, the efficiency of energy used for curing is reduced, or the web being irradiated generates heat, and in particular, the plastic base deforms.

According to the present invention, a magnetic recording medium having a smooth magnetic layer and having a surprisingly good wear resistance and electrical characteristics can be produced by applying the magnetic coating composition to a non-magnetic base, drying the layer, smoothing the surface thereof and irradiating the layer with electron beams.

The present invention is now described in greater detail by reference to the following examples and comparative examples which are provided here for illustrative purposes only, and are not intended to limit its scope. In the examples and comparative examples, all parts are by weight.

EXAMPLE 1

|  | parts |
|---|---|
| $\gamma$-$Fe_2O_3$ | 100 |
| Nitrocellulose (RS½ of Daicel Ltd.) | 8 |
| Polyester polyurethane (m.w.: ca. 30,000, reaction product of butanediol, adipic acid and diphenylmethane diisocyanate) | 8 |
| Ester acrylate oligomer (Aronix M6100 of Toagosei Chemical Co., Ltd.) | 3 |
| Hexamethylene diacrylate | 2 |
| Methyl ethyl ketone | 250 |
| Stearic acid | 1 |
| Butyl stearate | 1 |

The resulting coating composition was applied to a polyethylene terephthalate base (20μ thick) by a doctor blade to form a magnetic layer in a dry thickness of 8μ. The magnetic particles were oriented with a cobalt magnet, and the web was dried at 100° C. for one minute to eliminate the solvent. The web was passed through a 5-roll calender mill (cotton rolls and mirror finishing rolls) to smooth the magnetic layer (roll temperature: 40° C., nip pressure: 100 kg/cm). The web was then irradiated with electron beams to provide an absorbed dose of 5 megarads (acceleration voltage: 200 kilovolts, beam current: 10 milliamperes). The resulting tape was referred to as Sample No. 1.

COMPARATIVE EXAMPLE 1

A magnetic tape was prepared as in Example 1 except that the magnetic layer was not smoothed by calender rolls. The tape was referred to as Sample No. 2.

COMPARATIVE EXAMPLE 2

A magnetic tape was prepared as in Example 1 except that a coating composition having the formulation indicated below was used. The tape was referred to as Sample No. 3.

|  | parts |
|---|---|
| $\gamma$-$Fe_2O_3$ | 100 |
| Aronix M 6100 | 15 |
| Hexamethylene diacrylate | 5 |
| Methyl ethyl ketone | 250 |
| Stearic acid | 1 |
| Butyl stearate | 1 |

Sample Nos. 4 to 8 were prepared as in Example 1 except that the coating compositions having the formulations indicated below were used.

EXAMPLE 2 (SAMPLE NO. 4)

|  | parts |
|---|---|
| $\gamma$-$Fe_2O_3$ | 100 |
| VMCH (vinyl chloride/vinyl acetate/ maleic acid copolymer of Union Carbide Corporation, copolymerization ratio: 86/13/1) | 10 |
| Polyester polyurethane as used in | 10 |

Example 1

| | parts |
|---|---|
| Urethane acrylate oligomer (Aronix T 0386 of Toagosei Chemical Co., Ltd.) | 5 |
| Methyl ethyl ketone | 250 |
| Stearic acid | 1 |
| Butyl stearate | 1 |

EXAMPLE 3 (SAMPLE NO. 5)

| | parts |
|---|---|
| $\gamma$-$Fe_2O_3$ | 100 |
| 1000 G (vinyl chloride/vinyl acetate/ vinyl alcohol copolymer of Denki Kagaku Kogyo K.K., copolymerization ratio: 91/3/6) | 10 |
| Polyester polyurethane as used in Example 1 | 10 |
| Trimethylolpropane triacrylate | 5 |
| Stearic acid | 1 |
| Butyl stearate | 1 |
| Methyl ethyl ketone | 250 |

EXAMPLE 4 (SAMPLE NO. 6)

| | parts |
|---|---|
| $\gamma$-$Fe_2O_3$ | 100 |
| Butyl acrylate/acrylamide copolymer (copolymerization ratio: 10/1, $[\eta] = 0.25$) | 10 |
| Polyester polyurethane as used in Example 1 | 10 |
| Aronix M 6100 | 5 |
| Methyl ethyl ketone | 250 |
| Stearic acid | 1 |
| Butyl stearate | 1 |

EXAMPLE 5 (SAMPLE NO. 7)

| | parts |
|---|---|
| $\gamma$-$Fe_2O_3$ | 100 |
| Butyral resin (vinyl acetate/vinyl alcohol/butyral = 6/10/84, average degree of polymerization: 700) | 8 |
| Polyester polyurethane as used in Example 1 | 8 |
| Aronix M 6100 | 8 |
| Methyl ethyl ketone | 300 |
| Stearic acid | 1 |
| Butyl stearate | 1 |

COMPARATIVE EXAMPLE (SAMPLE NO. 8)

| | parts |
|---|---|
| $\gamma$-$Fe_2O_3$ | 100 |
| VYHH (vinyl chloride/vinyl acetate copolymer of Union Carbide Corporation, copolymerization ratio = 86/14) | 8 |
| Polyester polyurethane as used in Example 1 | 8 |
| Aronix M 6100 | 8 |
| Methyl ethyl ketone | 300 |
| Stearic acid | 1 |
| Butyl stearate | 1 |

The polymers used in preparing Sample Nos. 1 to 8 were subjected to an adsorption test to see how much of them were adsorbed on $\gamma$-$Fe_2O_3$ particles, and the test result is indicated in Table 1. In the test, a mixture of 10 g of ferromagnetic particles and 100 g of a 1 wt % polymer solution (solvent: methyl ethyl ketone) was stirred in a sealed system at 23° C. for 24 hours and, after allowing the mixture to stand, 50 g of the resulting supernatant was collected. The solvent was evaporated from the supernatant to dryness and the resulting residue (polymer) was weighed to calculate the amount of the polymer adsorbed to the ferromagnetic particles.

TABLE 1

| Polymer | Adsorption (wt %) |
|---|---|
| Nitrocellulose | 30 |
| VMCH | 65 |
| 1000 G | 25 |
| Butyl acrylate/acrylamide copolymer | 45 |
| Butyral resin | 50 |
| VYHH | 5 |

The sample Nos. 1 to 8 were subjected to dynamic friction coefficient test, still life and aquareness ratio (residual flux density/maximum flux density) measurements by running the tape 100 passes on a video tape recorder. The results are shown in Table 2 below.

TABLE 2

| Sample No. | Dynamic Friction Coefficient after 100 Passes | Still Life | Squareness Ratio | Stability of Magnetic Coating Composition |
|---|---|---|---|---|
| 1 | 0.29 | More than 60 min. | 0.78 | No change |
| 2 | Measurement impossible due to shed magnetic layer | 1 min. | 0.58 | " |
| 3 | 0.42 | 5 min. | 0.57 | Separated into two layers |
| 4 | 0.30 | More than 60 min. | 0.79 | No change |
| 5 | 0.29 | More than 60 min. | 0.80 | " |
| 6 | 0.31 | More than 60 min. | 0.79 | " |
| 7 | 0.30 | More than 60 min. | 0.82 | " |
| 8 | 0.43 | 7 min. | 0.59 | Separated into two layers |

While the invention has been described in detail and with reference to specific embodiments thereof, it will be apparent to one skilled in the art that various changes and modifications can be made therein without departing from the spirit and scope thereof.

What is claimed is:

1. A process for producing a magnetic recording medium which comprises the steps of applying onto a non-magnetic base a composition comprising (1) a compound having an unsaturated bond polymerizable by electron beams, (2) at least one polymer, (3) ferromagnetic particles, and (4) an organic solvent, and curing the resulting magnetic layer by irradiation with electron beams, said polymer being selected from the group consisting of nitrocellulose and a polymer containing 0.01 to 10 wt % of —$CO_2H$ group and, being such that at least 10% thereof is adsorbed on the ferromagnetic particles in a mixture of 10 parts by weight of a 1 wt % solution of the polymer and 1 part by weight of the ferromagnetic particles.

2. A process according to claim 1, wherein the adsorbable polymer is selected from the group consisting of nitrocellulose, a polymer containing from 0.01 to 10 wt. % of a —$CO_2H$ or —$CONH_2$ group and a butyral resin.

3. A process according to claim 1, wherein the magnetic layer is smoothed, before or after said irradiation with electron beams, by a from 1- to 30-roll calender mill comprising mirror finishing rolls and elastic rolls having a nip pressure of from 25 to 400 kg/cm and a temperature of from 10° to 150° C.

4. A process according to claim 1, or 3, wherein the adsorbable polymer is used in an amount of from 0.01 to 0.2 part by weight per part by weight of the ferromagnetic particles, and the weight ratio of the compound having an unsaturated bond polymerizable by electron beams to the adsorbable polymer is from 5:95 to 95:5.

5. A process according to claim 1, or 3, wherein the adsorbable polymer is used in an amount of from 0.05 to 0.15 part by weight per part by weight of the ferromagnetic particles, and the weight ratio of the compound having an unsaturated bond polyrizable by electron beams to the adsorbable polymer is from 10:90 to 90:10.

6. A magnetic recording medium prepared by the steps of applying onto a non-magnetic base a composition comprising (1) a compound having an unsaturated bond polymerizable by electron beams, (2) at least one polymer, (3) ferromagnetic particles, and (4) an organic solvent, and then polymerizing and curing the resulting magnetic layer by irradiation with electron beams, and polymer being selected from the group consisting of nitrocellulose and a polymer containing 0.1 to 10 wt % of —$CO_2H$ group and, being such that at least 10% thereof is adsorbed on the ferromagnetic particles in a mixture of 10 parts by weight of a 1 wt % solution of the polymer and 1 part by weight of the ferromagnetic particles.

7. A magnetic recording medium as claimed in claim 6 wherein the adsorbable polymer is selected from the group consisting of nitrocellulose, acetyl butyl cellulose, a polymer containing from 0.01 to 10 wt. % of —$CO_2H$ or —$CONH_2$ group and a butyral resin.

* * * * *